(12) United States Patent
Kusano et al.

(10) Patent No.: US 6,247,762 B1
(45) Date of Patent: Jun. 19, 2001

(54) VEHICLE BRAKING SYSTEM WITH A STROKE SIMULATOR AND A SERVO DEVICE

(75) Inventors: Akihito Kusano, Toyota; Masahiro Inden, Kariya; Toshiaki Hamada, Okazaki; Hiroshi Toda, Kariya, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/452,721

(22) Filed: Dec. 3, 1999

(30) Foreign Application Priority Data

Dec. 4, 1998 (JP) .................................................. 10-361898

(51) Int. Cl.$^7$ .................................................... B60T 13/74
(52) U.S. Cl. .................................................................. 303/3
(58) Field of Search ..................... 303/3, 13–15, 303/20, 115.1, 115.2, 116.1, 155, DIG. 3, DIG. 4

(56) References Cited

U.S. PATENT DOCUMENTS

| | | | |
|---|---|---|---|
| 5,567,021 | * 10/1996 | Gaillard | 303/3 |
| 5,951,116 | * 9/1999 | Nagasaka | 303/14 |
| 6,027,182 | * 2/2000 | Nagasaka | 303/116.1 |
| 6,058,705 | * 5/2000 | Schunck | 60/562 |

FOREIGN PATENT DOCUMENTS

| | | |
|---|---|---|
| 2-99061 | 8/1990 | (JP) . |
| 2-49943 | 10/1990 | (JP) . |

* cited by examiner

Primary Examiner—Christopher P. Schwartz
Assistant Examiner—C. T. Bartz
(74) Attorney, Agent, or Firm—Burns, Doane, Swecker & Mathis LLP

(57) ABSTRACT

The present invention is directed to a vehicle braking system having a stroke simulator and a servo device, which includes a pressure generator for generating a hydraulic braking pressure, a wheel brake cylinder operatively mounted on each wheel of the vehicle, a pressure control valve device which is disposed in a passage for communicating the pressure generator with the wheel brake cylinder, to control the hydraulic braking pressure supplied to the wheel brake cylinder, and an electronic controller for controlling at least in response to an amount of operation of the brake pedal. A master cylinder is provided for communicating with the wheel brake cylinder and supplying the hydraulic braking pressure into it in response to operation of the brake pedal, when at least one of the pressure generator, the pressure control valve device and the electronic controller is abnormal. A stroke simulator is connected to the master cylinder, and arranged to allow the brake pedal to advance in response to the amount of operation of the brake pedal. And, a servo device is provided for assisting the master cylinder to operate when at least one of the pressure generator, the pressure control valve device and the electronic controller is abnormal.

7 Claims, 5 Drawing Sheets

VEHICLE BRAKING SYSTEM WITH A STROKE SIMULATOR AND A SERVO DEVICE

This application claims priority under 35 U.S.C. Sec. 119 to No. 10-361898 filed in Japan on Dec. 4, 1998, the entire content of which is herein incorporated by reference.

BACKGROUND OF THE INVENTION

1. Field of the invention

The present invention relates to a braking system for applying braking force to wheels of a vehicle, and more particularly to the braking system having a pressure generator for generating a hydraulic braking pressure to wheel brake cylinders in response to operation of a brake pedal, and a stroke simulator for providing a dummy braking load to the brake pedal.

2. Description of the Related Arts

With respect to a vehicle braking system, an apparatus called "brake by wire" has been noted recently. The brake by wire apparatus is provided with a pressure generator for generating a hydraulic braking pressure independent of a conventional master cylinder, and adapted to control a braking pressure control valve device in response to operation of the brake pedal to supply the hydraulic braking pressure from the pressure generator to the wheel brake cylinders, and supply the hydraulic braking pressure output from the master cylinder to a stroke simulator, as shown in Japanese Patent Laid-open Publication No. 2-49943, for example. The publication discloses a braking apparatus having a servo pressure generating device, wherein a device associated with the master cylinder for providing a brake feeling, which corresponds to the stroke simulator, is connected to a brake passage, which is opened or closed by an electromagnetic valve device. The valve device is turned on when a servo braking system is normal, and turned off when it is failed. The braking apparatus has a pressure control valve with a plurality of positions to be selected.

According to the braking apparatus as disclosed in that publication, if the pressure control valve or the like is failed, for example, it is necessary for a vehicle driver to apply a relatively large force to the brake pedal to obtain a sufficient braking force. In order to solve this problem, it can be proposed to provide a conventional booster such as a hydraulic booster or vacuum booster. In this case, however, if either one of those boosters is installed in that braking apparatus, the hydraulic braking pressure applied to the stroke simulator will be large even in the normal state. In order to overcome this problem, therefore, it is necessary to install a spring with a large spring constant in the stroke simulator. As a result, the stroke simulator is made large in size, and high in cost.

SUMMARY OF THE INVENTION

Accordingly, it is an object of the present invention to provide a vehicle braking system which applies a hydraulic braking pressure generated by a pressure generator to a wheel brake cylinder, through a pressure control valve device controlled in response to operation of a brake pedal, and which includes a stroke simulator for allowing the brake pedal to advance in response to the amount of operation of the brake pedal, wherein a sufficient braking force can be obtained with an ordinary depressing force applied to the brake pedal, even if the pressure generator, pressure control valve device and the like are abnormal, and wherein it can be made small in size and low in cost.

In accomplish the above and other objects, a vehicle braking system is provided with a pressure generator for generating a hydraulic braking pressure, a wheel brake cylinder which is operatively mounted on each wheel of the vehicle for applying a braking force to the wheel with the hydraulic braking pressure supplied by the pressure generator, a pressure control valve device which is disposed in a passage for communicating the pressure generator with the wheel brake cylinder, and which controls the hydraulic braking pressure supplied to the wheel brake cylinder, and an electronic controller for controlling the pressure control valve device at least in response to an amount of operation of a brake pedal. A master cylinder is provided for communicating with the wheel brake cylinder and supplying the hydraulic braking pressure into the wheel brake cylinder in response to operation of the brake pedal, when at least one of the pressure generator, the pressure control valve device and the electronic controller is abnormal. A stroke simulator is connected to the master cylinder for allowing the brake pedal to advance in response to the amount of operation of the brake pedal. And, a servo device is provided for assisting the master cylinder to operate when at least one of the pressure generator, the pressure control valve device and the electronic controller is abnormal.

Preferably, the servo device is a hydraulic servo device for supplying the hydraulic braking pressure into the master cylinder in response to operation of the brake pedal. This braking system may further include a valve device which prohibits the operation of the hydraulic servo device when all of the pressure generator, the pressure control valve device and the electronic controller are normal, and which allows the operation of the hydraulic servo device when at least one of the pressure generator, the pressure control valve device and the electronic controller is abnormal.

The servo device may be a vacuum servo device for assisting the master cylinder to operate in response to operation of the brake pedal, with negative pressure used for activating the vacuum servo device as a power source. This braking system may further include a valve device which prohibits the operation of the vacuum servo device when all of the pressure generator, the pressure control valve device and the electronic controller are normal, and which allows the operation of the vacuum servo device when at least one of the pressure generator, the pressure control valve device and the electronic controller is abnormal.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
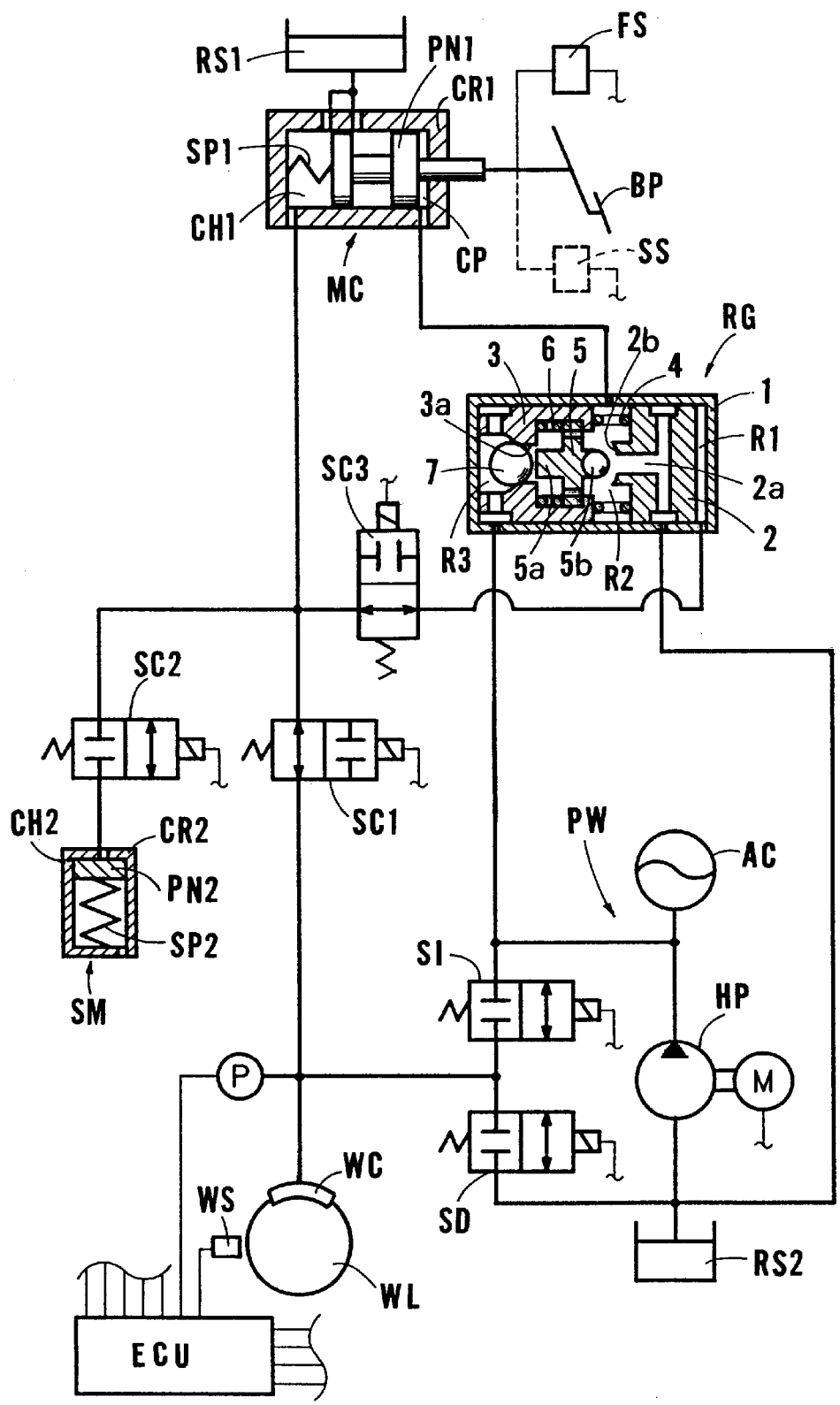
FIG. 1 is a block diagram showing a braking system according to a first embodiment of the present invention.

Referring to FIG. 1, there is schematically illustrated a first embodiment of a vehicle braking system according to the present invention. A wheel brake cylinder WC is operatively mounted on a wheel WL as shown in FIG.1, to apply a braking force to the wheel WL, with a hydraulic braking pressure supplied to the wheel brake cylinder WC. As a pressure generator according to the present embodiment, a power pressure source PW is provided for supplying a power pressure to the wheel brake cylinder WC of the wheel WL in response to operation of the brake pedal BP. The power pressure source PW includes a reservoir RS2, a hydraulic pressure pump HP and an accumulator AC. The hydraulic pressure pump HP is driven by an electric motor M to introduce brake fluid into its input port from the reservoir RS2, pressurize it to a predetermined pressure, and discharge it from its output port. The accumulator AC accumulates the brake fluid discharged from the hydraulic pump HP.

In a passage connecting the power pressure source PW with the wheel brake cylinder WC, there is disposed a pressure control valve device which controls the hydraulic braking pressure supplied to the wheel brake cylinder WC. The pressure control valve device of the present embodiment is provided with a normally closed solenoid operated switching valve SI (hereinafter, simply referred to as the solenoid valve SI) and a normally closed solenoid operated switching valve SD (hereinafter, simply referred to as the solenoid valve SD). The solenoid valve SI is disposed between the wheel brake cylinder WC and the accumulator AC connected to the output port of the hydraulic pressure pump HP, so that when the solenoid valve SI is opened, the pressure in the wheel brake cylinder WC is increased. Whereas, the solenoid valve SD is disposed between the wheel brake cylinder WC and the reservoir RS2 connected to the input port of the hydraulic pressure pump HP, so that when the solenoid valve SD is opened, the pressure in the wheel brake cylinder WC is reduced. These solenoid valves SI, SD are of a two-port two-position solenoid type, and may be of a linear solenoid type. The wheel brake cylinder WC is connected with a master cylinder MC through a normally open solenoid operated switching valve SC1 (hereinafter, simply referred to as solenoid valve SC1). The solenoid valve SC1 is placed in a closed position when the solenoid valves SI, SD and an electronic controller ECU as described later are normal, to act as a so-called cut-off valve. The master cylinder MC of the present embodiment is communicated with the wheel brake cylinder WC through the solenoid valve SC1 placed in its open position, to supply the hydraulic braking pressure into the wheel brake cylinder WC in response to operation of the brake pedal BP. The abnormality of at least one of the solenoid valves SI, SD and the electronic controller ECU will arise in such a case where the solenoid valves SI, SD are not operated to be placed in their closed positions, where the electronic controller ECU is failed, where the electronic controller ECU is not supplied with the electric power while an ignition switch (not shown) has already been turned on, and the like.

The master cylinder MC is formed in the same fashion as a conventional master cylinder. That is, a piston PN1 connected to the brake pedal BP is slidably received in a cylinder CR1, and a compression spring SP1 is received in a pressure chamber CH1 which is defined between the cylinder CR1 and the piston PN1. The pressure chamber CH1 is communicated with a reservoir RS1, or prevented from communicating with it, in response to a sliding movement of the piston PN1, and communicated with the wheel brake cylinder WC through the solenoid valve SC1 placed in its open position. According to the present embodiment, the master cylinder MC is used for a fail-safe purpose when the power pressure source PW is abnormal, and may be formed into a tandem master cylinder. Furthermore, in order to provide a brake feeling in response to a depressing force applied to the brake pedal BP, with the solenoid valve SC1 placed in its closed position, a stroke simulator SM is disposed for advancing the brake pedal BP in response to an amount of operation (depressing force) of the brake pedal BP, to provide a desired stroke. If the power pressure source PW operates normally, the solenoid valve SC1 is placed in its closed position to block the communication between the master cylinder MC and the wheel brake cylinder WC, as described later, the stroke simulator SM will provide a stroke corresponding to the depressing force applied to the brake pedal BP.

The stroke simulator SM includes a cylinder CR2, a piston PN2 connected to the brake pedal BP and slidably received in the cylinder CR2, and a compressed spring SP2 received in a fluid chamber CH2, which is defined between the cylinder CR2 and the piston PN2 (contacted with each other in FIG. 1). The fluid chamber CH2 of the stroke simulator SM is connected to the passage between the master cylinder MC and the solenoid valve SC1, through a normally open solenoid operated switching valve SC2 (hereinafter, simply referred to as solenoid valve SC2). The stroke simulator SM may be formed in a body with the master cylinder MC.

As for a booster for assisting the master cylinder MC to advance when the power pressure source PW is abnormal, a regulator valve RG is installed according to the present embodiment. The regulator valve RG includes a cylinder 1, pistons 2, 3 received therein, and a compression spring 4 for biasing the pistons 2, 3 to expand a space between them. The piston 2 is formed with a passage 2a which is defined in a longitudinal direction and radial direction to communicate an outer peripheral space of the piston 2 with a space in front of the piston 2 (its left side in FIG. 1). The passage 2a is opened at the front end of the piston 2 to form a valve seat 2b about the passage 2a. At the opposite ends of the piston 3, recesses are formed to communicate with each other through a passage 3a. A valve member 5 is slidably received in the recess defined at the rear end of the piston 3. The valve member 5 has a plunger 5a formed at its front end, and a valve body 5b fixed at its rear end. The valve member 5 is biased toward the piston 2 by a compression spring 6, and arranged to be engaged with the piston 3 at a position where the tip end of the plunger 5a is away from the passage 3a. A spherical valve body 7 is accommodated in the front recess of the piston 3 to shut off the passage 3a. Accordingly, a pressure chamber R1 is defined behind the piston 2 (its right side in FIG. 1), a regulator chamber R2 is defined between the piston 2 and the piston 3, and a pressure chamber R3 is defined in front of the piston 3. The pressure chamber R1 is communicated with the master cylinder MC through a normally open solenoid operated switching valve SC3 (hereinafter, simply referred to as solenoid valve SC3), while the pressure chamber R3 is communicated with the accumulator AC of the power pressure supply source PW. The pressure chamber R2 is communicated with the power chamber CP of the master cylinder MC. The pressure chamber R2 is communicated with the reservoir RS2 through the passage 2a, when the valve body 5b is placed away from the valve seat 2b.

When the master cylinder pressure is supplied to the pressure chamber R1 through the solenoid valve SC3 placed in its open position, the piston 2 is advanced to place the valve body 5b of the valve member 5 to be seated on the valve seat 2b, thereby to shut off the passage 2a. In this state, if the master cylinder pressure supplied to the pressure chamber R1 is greater than the pressure in the regulator chamber R2 and the biasing force of the spring 4, the valve member 5 is advanced together with the piston 2, so that the valve body 7 is pushed by the plunger 5a to move away from the valve seat (passage 3a), thereby to communicate the pressure chamber R3 with the regulator chamber R2. In this case, if the power pressure has been accumulated in the accumulator AC of the power pressure source PW, the power pressure is fed into the regulator chamber R2 through the pressure chamber R3 and the passage 3a. Consequently, the pressure in the regulator chamber R2 is increased and supplied to the power chamber CP of the master cylinder MC. As a result, the piston 2 is moved in response to a pressure difference between the pressure applied to the piston 2 at the rear end thereof and the pressure applied to the piston 2 at the front end thereof, so that the pressure chamber R3 will be communicated with the regulator chamber R2, or its communication with the regulator chamber R2 will be prevented, to regulate the pressure in the regulator chamber R2 to be approximately equal to the master cylinder pressure. With the regulator pressure supplied to the power chamber CP of the master cylinder MC, the piston PN1 is forced to advance.

When the brake pedal BP is released, the pressure in the pressure chamber R1 is reduced, so that the communication between the pressure chamber R3 and the regulator chamber R2 is blocked by the valve body 7, and then the valve body 5b is moved away from the valve seat 2b to communicate the passage 2a with the regulator chamber R2. Consequently, the power chamber CP is communicated with the reservoir RS2, so that the pressure in the power chamber CP is reduced, whereby the brake pedal BP is returned to its initial position. If the solenoid valve SC3 is placed in its closed position in such a state as shown in FIG. 1, the hydraulic braking pressure output from the master cylinder MC is not supplied to the pressure chamber R1. Therefore, the valve body 5b is not seated on the valve seat 2b, so that the regulator chamber R2 is communicated with the reservoir RS2 through the passage 2a. As long as the solenoid valve SC3 is placed in its closed position, therefore, the power chamber CP of the master cylinder MC is communicated with the reservoir RS2 to be under the atmospheric pressure.

The solenoid valves SI, SD, SC1, SC2, SC3, and the motor M of the hydraulic pressure pump HP are electrically connected to an electronic controller ECU, to be controlled thereby, respectively. Furthermore, there are disposed a pressure sensor P for detecting the pressure in the wheel brake cylinder WC, a depressing force sensor FS for detecting an amount of operation (depressing force) applied to the brake pedal BP, and a wheel speed sensor WS for detecting a rotational speed of the wheel WL, all of which are electrically connected to the electronic controller ECU, as well. In order to detect the amount of operation of the brake pedal BP, a stroke sensor SS for detecting a moving distance of the brake pedal BP may be installed, as indicated by a broken line in FIG. 1. The electronic controller ECU is provided with a microcomputer (not shown) which includes a central processing unit (CPU), memories (ROM, RAM), input and output ports or the like. The memory (ROM) memorizes a program for processing various routines, the central processing unit (CPU) executes the program while an ignition switch (not shown) is closed. The memory (RAM) temporally memorizes variable data needed to execute the program.

In operation, when the brake pedal BP is not depressed, the system is held as shown in FIG. 1, where the solenoid valves SC1, SC2, SC3, SI (for increasing the pressure), and SD (for decreasing the pressure) are de-energized, and the piston PN1 is placed in its initial position as shown in FIG. 1, so that the pressure chamber CH1 of the master cylinder MC is communicated with the reservoir RS1. The power pressure source PW is in its stopped state. In the case where the solenoid valves SI, SD and the electronic controller ECU are normal, when the brake pedal BP is depressed, and the operation thereof is detected by the controller ECU in response to the output signal of the depressing force sensor FS, the solenoid valves SC1, SC3 are energized to be placed in their closed positions, while the solenoid valve SC2 is energized to be placed in its open position. Then, the motor M of the power pressure source PW is activated. As long as the solenoid valve SC3 is closed, therefore, the power chamber CP of the master cylinder MC is communicated with the reservoir RS2, whereby the regulator valve RG is prohibited from acting as the hydraulic booster.

In the controller ECU, a desired hydraulic pressure for the wheel brake cylinder WC is calculated on the basis of the depressing force applied to the brake pedal BP, and the duties of the solenoid valves SI and SD are controlled to provide the wheel cylinder pressure equal to the desired pressure. In this case, as far as the master cylinder MC is concerned, the piston PN1 is prevented from advancing after the communication between the pressure chamber CH1 and the reservoir RS1 is blocked. However, since the solenoid SC2 has been energized to be placed in its open position, the pressure chamber CH1 is communicated with the fluid chamber CH2. Consequently, the piston PN2 is forced to move downward in FIG. 1 against the biasing force of the spring SP2, to expand the fluid chamber CH2. As a result, the piston PN1 is advanced to provide a stroke of the brake pedal BP in response to the depressing force applied thereto.

In the case where the solenoid valves SI, SD and the electronic controller ECU are normal, when it is determined that the wheel WL is likely to be locked during the braking operation, for example, the solenoid valves SI, SD are activated by the controller ECU to perform the anti-skid control operation. At the outset, when the solenoid valve SI is closed, and the solenoid valve SD is opened, with the solenoid valve SC1 held to be in its closed position, the wheel brake cylinder WC is communicated with the reservoir RS2 through the solenoid valve SD, whereby the brake fluid in the wheel brake cylinder WC is drained to the reservoir RS2 to reduce the pressure in the wheel brake cylinder WC. When it is needed to increase the pressure after the pressure was fully decreased, the solenoid valve SD is placed in its closed position, and the duty of the solenoid valve SD is controlled. Thus, the braking force applied to each wheel is controlled, independently from each other.

In the case where at least one of the solenoid valves SI, SD and the controller ECU is abnormal, the solenoid valves SC1, SC2, SC3, SI (for increasing the pressure), and SD (for decreasing the pressure) are de-energized to return to the state as shown in FIG. 1. In this state, when the brake pedal BP is depressed, the piston PN1 is advanced in response to operation of the brake pedal BP, the master cylinder pressure is supplied from the pressure chamber CH1 of the master cylinder MC to the wheel brake cylinder WC through the solenoid valve SC1 placed in its open position. In this case, the master cylinder pressure is also supplied to the pressure chamber R1 of the regulator valve RG through the solenoid valve SC3 placed in its open position, the valve body 5b is seated on the valve seat 2b to advance the piston 2 and the valve member 5 in a body, and the valve body 7 is pushed to move away from the valve seat (passage 3a). As a result, the power pressure accumulated in the accumulator AC of the power pressure source PW is fed into the pressure chamber R3 of the regulator valve RG, and then into the regulator chamber R2 through the passage 3a, and supplied to the power chamber CP of the master cylinder MC. Thereafter, the pressure in the regulator chamber R2 is regulated in response to operation of the brake pedal BP to be approximately equal to the master cylinder pressure, and the regulated pressure is supplied to the power chamber CP of the master cylinder MC to assist the piston PN1 to advance. That is, the master cylinder MC is boosted. When the brake pedal BP is released, the pressure in the pressure chamber R1 is reduced, so that the communication between the pressure chamber R3 and the regulator chamber R2 is blocked by the valve body 7, and then the valve body 5b is moved away from the valve seat 2b to communicate the passage 2a with the regulator chamber R2. Consequently, the power chamber CP is communicated with the reservoir RS2, so that the pressure in the power chamber CP is reduced, whereby the brake pedal BP is returned to its initial position.

Figure 2:
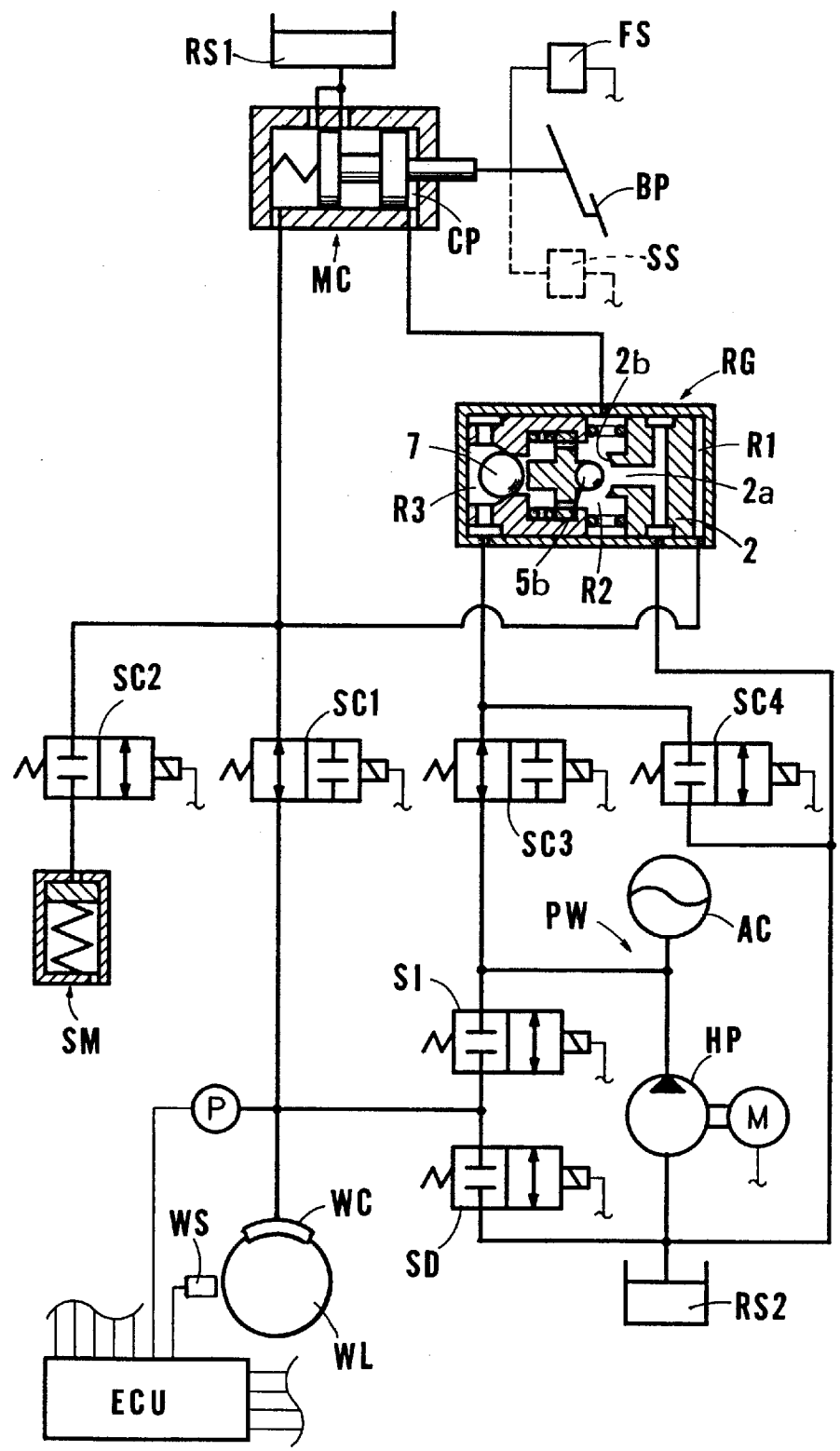
FIG. 2 is a block diagram showing a braking system according to a second embodiment of the present invention.

FIG. 2 shows a second embodiment of the present invention, wherein the normally open solenoid operated switching valve SC3 is disposed on a passage for communicating the pressure chamber R3 of the regulator valve RG with the power pressure source PW, while the solenoid valve SC3 in the first embodiment is disposed on the passage for communicating the pressure chamber R1 of the regulator valve RG with the master cylinder MC. In the second embodiment, there is also disposed a normally closed solenoid operated switching valve SC4 (hereinafter, simply referred to as the solenoid valve SC4) is disposed between the pressure chamber R3 and a passage for communicating the regulator valve RG with the reservoir RS2. The rest of the components of the present embodiment are substantially the same as those in the first embodiment as shown in FIG. 1, the detailed explanation about them will be omitted.

According to the second embodiment, therefore, when the brake pedal BP is not depressed, the solenoid valves SC1–SC4, SI and SD are de-energized as shown in FIG. 2, and the power pressure source PW is in its stopped state. In the case where the solenoid valves SI, SD and the electronic controller ECU are normal, when the brake pedal BP is depressed, the solenoid valves SC1, SC3 are energized to be placed in their closed positions, while the solenoid valves SC2, SC4 are energized to be placed in their open positions. Therefore, the pressure chamber R3 and the regulator chamber R2 are communicated with the reservoir RS2 through the solenoid valve SC4 placed in its open position, whereby the regulated pressure is not output from the regulator valve RG to prohibit the boosting action. And, the desired hydraulic pressure for the wheel brake cylinder WC is calculated on the basis of the depressing force applied to the brake pedal BP, and the duties of the solenoid valves SI and SD are controlled to provide the wheel cylinder pressure equal to the desired pressure. In this case, since the solenoid valve SC2 has been energized to be placed in its open position, the pressure chamber CH1 of the master cylinder MC is communicated with the fluid chamber CH2. As a result, the stroke of the brake pedal BP is provided in response to the depressing force applied thereto.

In the case where at least one of the solenoid valves SI, SD and the controller ECU is abnormal, the solenoid valves SC1–SC4, SI and SD are de-energized to return to the state as shown in FIG. 2. In this state, when the brake pedal BP is depressed, the power pressure accumulated in the accumulator AC of the power pressure source PW is supplied to the power chamber CP of the master cylinder MC. Thereafter, the pressure in the regulator chamber R2 is regulated in response to operation of the brake pedal BP to be approximately equal to the master cylinder pressure, and the regulated pressure is supplied to the power chamber CP of the master cylinder MC to assist the piston PN1 to advance, i.e. to be boosted. When the brake pedal BP is released, the pressure in the pressure chamber R1 is reduced, so that the communication between the pressure chamber R3 and the regulator chamber R2 is blocked by the valve body 7, and then the valve body 5b is moved away from the valve seat 2b to communicate the passage 2a with the regulator chamber R2. Consequently, the power chamber CP is communicated with the reservoir RS2, so that the pressure in the power chamber CP is reduced, whereby the brake pedal BP is returned to its initial position. In lieu of the solenoid valves SC3, SC4 in this embodiment, a three-port two-position solenoid operated changeover valve (not shown) may be used.

Figure 3:
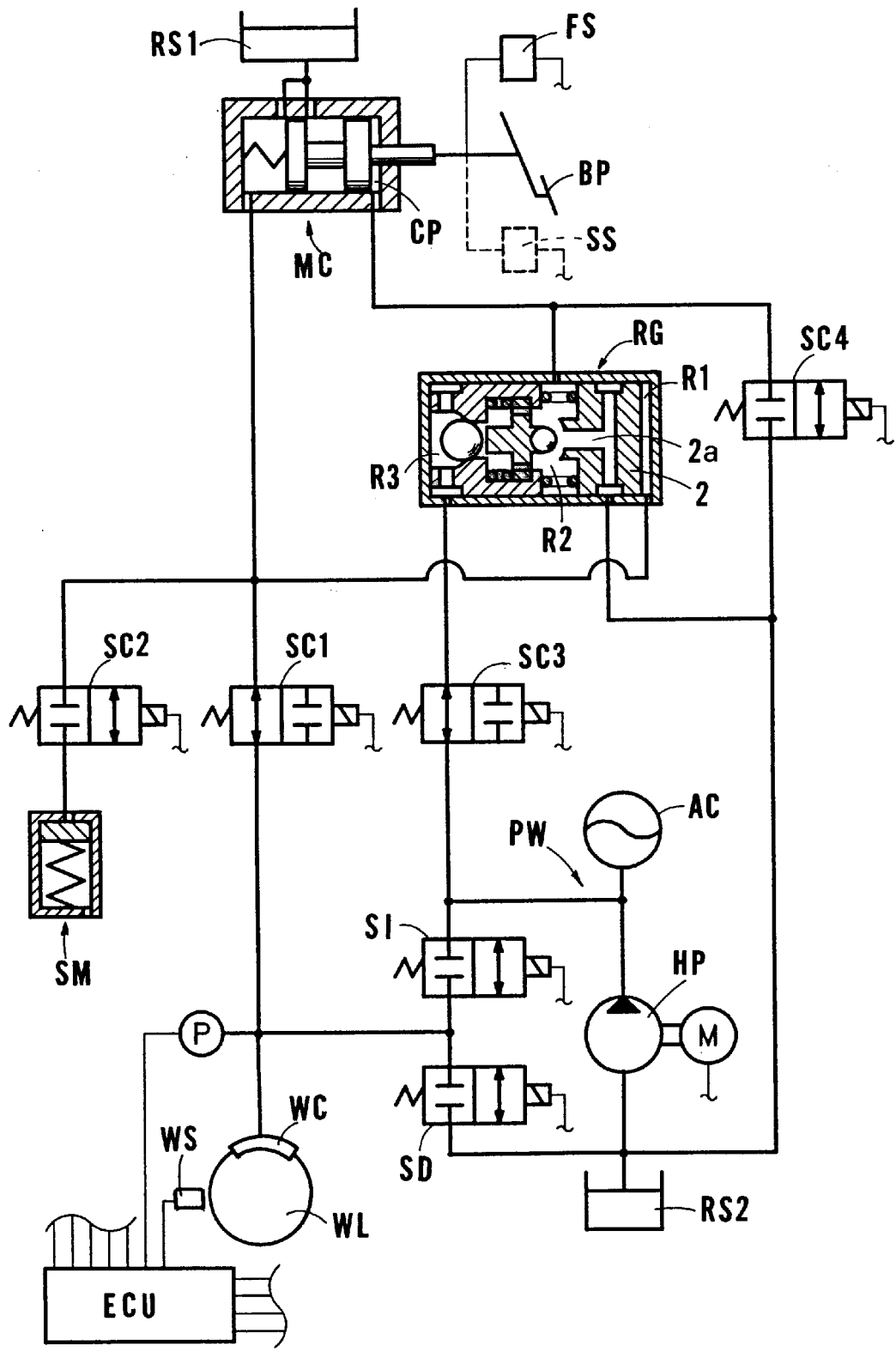
FIG. 3 is a block diagram showing a braking system according to a third embodiment of the present invention.

FIG. 3 shows a third embodiment of the present invention, wherein the normally closed solenoid operated switching valve SC4 is disposed between a passage for communicating the regulator valve RG with the reservoir RS2 and a passage for communicating the power chamber CP of the master cylinder MC with the regulator chamber R2, while the solenoid vale valve SC4 in the second embodiment is disposed between the pressure chamber R3 and a passage for communicating the regulator valve RG with the reservoir RS2. The rest of the components of the present embodiment are substantially the same as those in the first and second embodiments as shown in FIGS.1 and 2, the detailed explanation about them will be omitted.

According to the third embodiment, therefore, the system operates in substantially the same manner as the second embodiment, except that in the case where the solenoid valves SI, SD and the electronic controller ECU are normal, when the brake pedal BP is depressed, the solenoid valve SC3 is energized to be placed in its closed position, and the solenoid valve SC4 is energized to be placed in its open position. Consequently, the power pressure is not supplied from the power pressure source PW to the regulator valve RG, and the power chamber CP of the master cylinder MC is communicated with the reservoir RS2, whereby the boosting action to the brake pedal BP is not performed.

Figure 4:
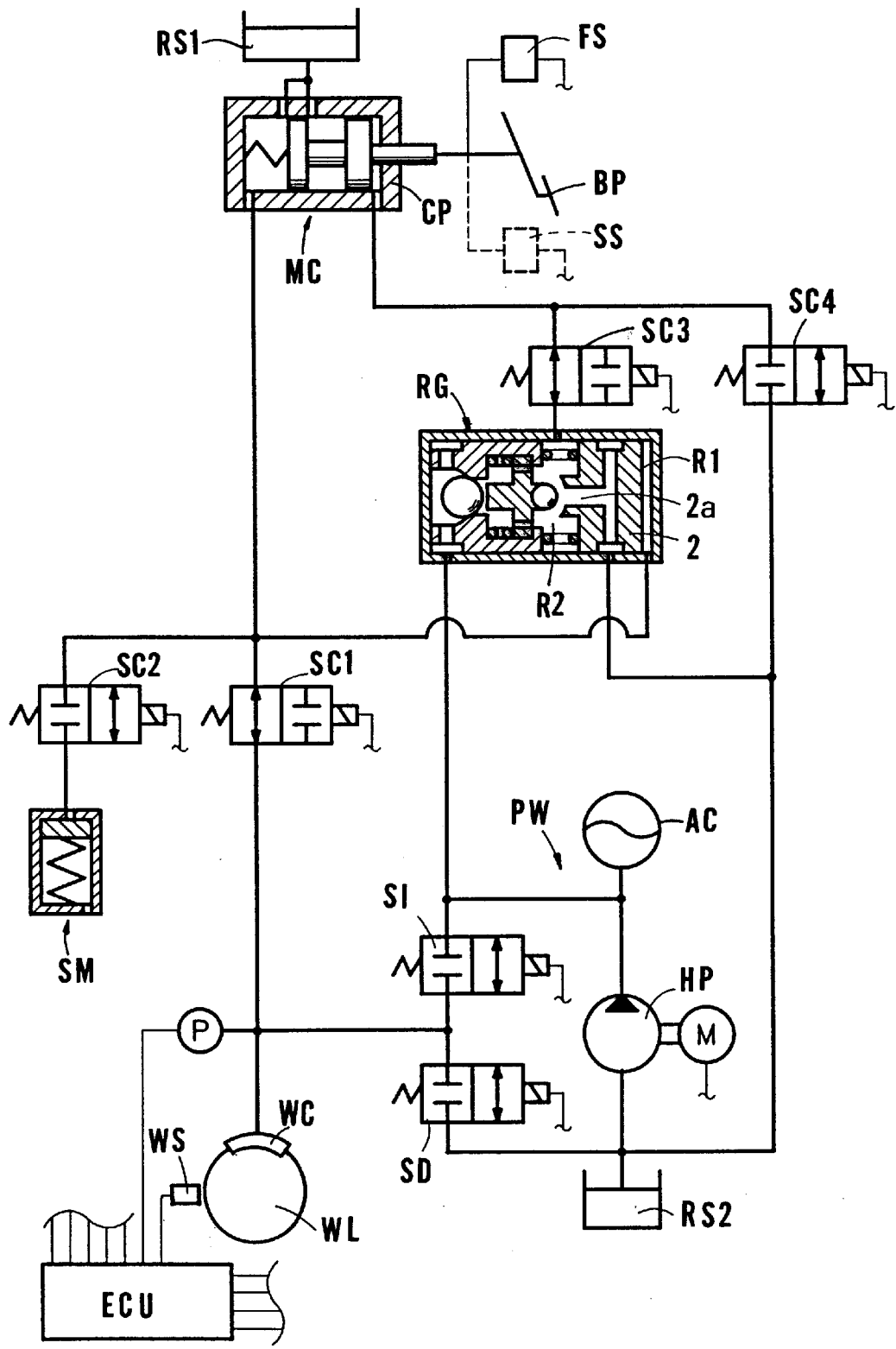
FIG. 4 is a block diagram showing a braking system according to a fourth embodiment of the present invention.

FIG. 4 shows a fourth embodiment of the present invention, wherein the normally open solenoid operated switching valve SC3 is disposed on a passage for communicating the power chamber CP of the master cylinder MC with the regulator chamber R2, while the solenoid vale SC3 in the third embodiment is disposed on the passage for communicating the pressure chamber R3 of the regulator valve RG with the power pressure source PW. In the fourth embodiment, the solenoid valve SC4 is disposed between a passage for communicating the regulator valve RG with the reservoir RS2 and a passage for communicating the power chamber CP of the master cylinder MC with the solenoid valve SC3. The rest of the components of the present embodiment are substantially the same as those in the embodiments as shown in FIGS. 1–3, the detailed explanation about them will be omitted.

According to the fourth embodiment, therefore, the solenoid valve SC3 operates in a manner similar to that of the third embodiment, so that in the case where the solenoid valves SI, SD and the electronic controller ECU are normal, when the brake pedal BP is depressed, the solenoid valves SC1, SC3 are energized to be placed in their closed positions, while the solenoid valves SC2, SC4 are energized to be placed in their open positions. Consequently, the power chamber CP of the master cylinder MC is communicated with the reservoir RS2 thereby to prohibit the boosting action. In the case where at least one of the solenoid valves SI, SD and the controller ECU is abnormal, the solenoid valves SC1–SC4, SI (for increasing the pressure), and SD (for decreasing the pressure) are de-energized to return to the state as shown in FIG. 4. In this state, when the brake pedal BP is depressed, the master cylinder pressure is supplied from the pressure chamber CH1 of the master cylinder MC to the wheel brake cylinder WC through the solenoid valve SC1 placed in its open position. In this case, the master cylinder pressure is supplied to the pressure chamber R1 of the regulator valve RG, the power pressure accumulated in the accumulator AC of the power pressure source PW is supplied to the power chamber CP of the master cylinder MC, thereby to assist the piston PN1 to advance, i.e., the boosting action to the master cylinder MC is performed.

According to the fourth embodiment, the solenoid valve SC4 operates in substantially the same manner as that of the third embodiment. When the brake pedal BP is released, the power chamber CP of the master cylinder MC is communicated with the reservoir RS2, so that the brake pedal BP is immediately returned to its initial position. In lieu of the solenoid valves SC3, SC4 in this embodiment, the three-port two-position solenoid operated changeover valve (not shown) may be used.

Figure 5:
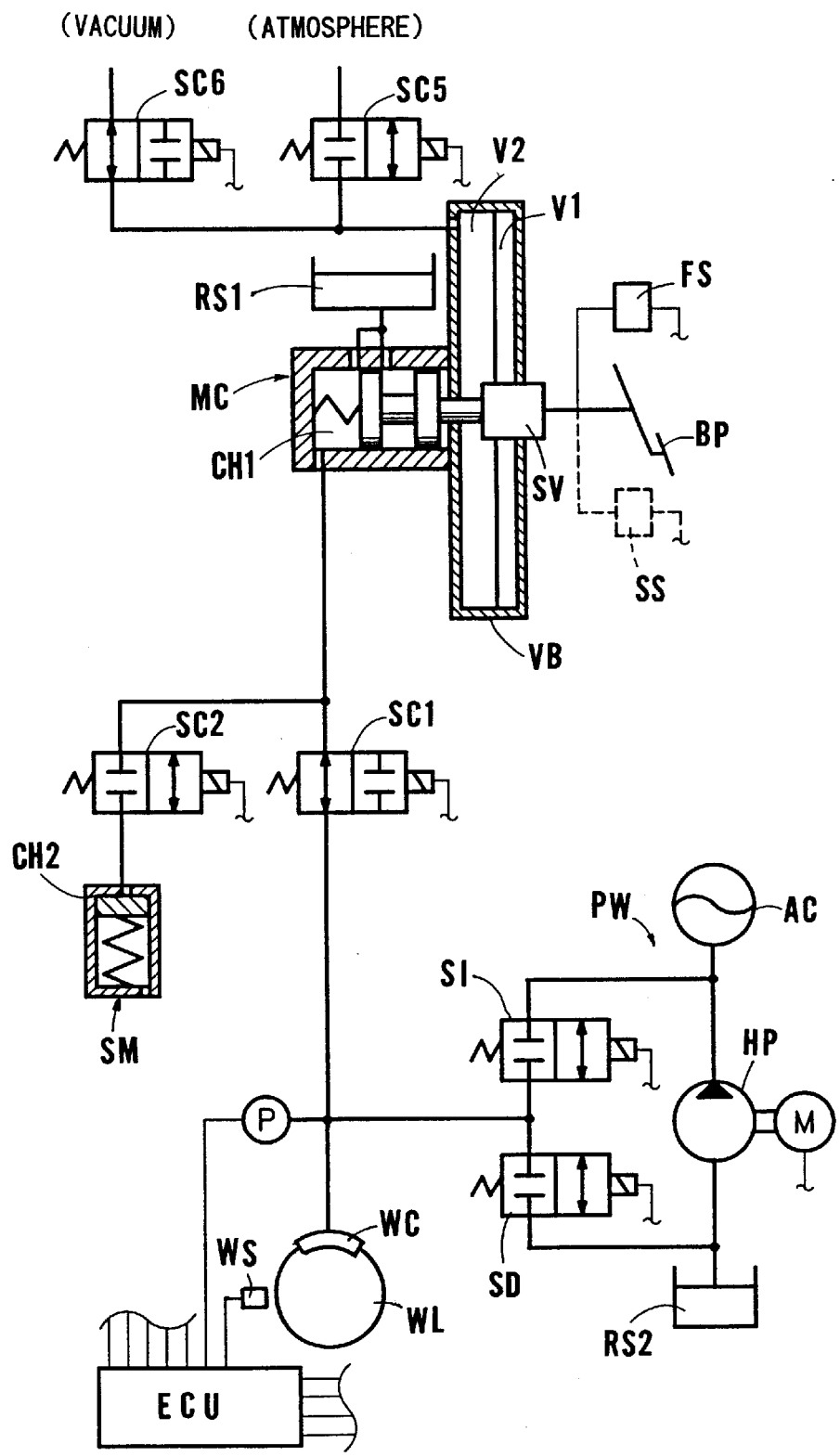
FIG. 5 is a block diagram showing a braking system according to a fifth embodiment of the present invention.

FIG. 5 shows a fifth embodiment of the present invention, wherein a conventional vacuum booster VB is used, while the hydraulic booster with the regulator valve RG is used in the embodiments as shown in FIGS. 1–4. As known heretofore, the vacuum booster VB is supplied with vacuum from a vacuum source, to boost the master cylinder MC in response to operation of the brake pedal BP. In the fifth embodiment, there is disposed a vacuum changeover valve device, which includes a normally closed solenoid operated switching valve SC5 (hereinafter, simply referred to as the solenoid valve SC5) and a normally open solenoid operated switching valve SC6 (hereinafter, simply referred to as the solenoid valve SC6) are disposed as shown in FIG. 5, in stead of the solenoid valves SC3, SC4. That is, the master cylinder MC is connected with the vacuum booster VB having a constant pressure chamber V2, which is communicated with an atmospheric pressure source (e.g., inside of an air cleaner) through the solenoid valve SC5, and communicated with the vacuum source (e.g., inside of an intake manifold) through the solenoid valve SC6. In FIG. 5, "V1" indicates a variable chamber, and "SV" indicates a control valve of the vacuum booster, whose structure is the same as shown in, for example, Japanese Utility model Laid-open Publication No. 2-99061, the disclosure of which is hereby incorporated by reference in its entirety. The rests of the components of the present embodiment are substantially the same as those in the embodiment as shown in FIGS. 1–4, the detailed explanation about them will be omitted.

According to the fifth embodiment, therefore, when the brake pedal BP is not depressed, the solenoid valves SC1, SC2, SC5, SC6, SI and SD are de-energized as shown in FIG. 5. In the case where the power pressure source PW, the solenoid valves SI, SD and the electronic controller ECU are normal, when the brake pedal BP is depressed, the solenoid valves SC1, SC6 are energized to be placed in their closed positions, and the solenoid valves SC2, SC5 are energized to be placed in their open positions. And, the desired hydraulic pressure for the wheel brake cylinder WC is calculated on the basis of the depressing force applied to the brake pedal BP, and the duties of the solenoid valves SI and SD are controlled to provide the wheel cylinder pressure equal to the desired pressure. In this case, since the solenoid valve SC2 has been energized to be placed in its open position, the stroke of the brake pedal BP is provided in response to the depressing force applied thereto. With respect to the vacuum booster VB, the vacuum chamber V2 is communicated with the atmosphere through the solenoid valve SC5 placed in its open position thereby to be under the atmospheric pressure, and it is not communicated with the vacuum source by the solenoid valve SC6 placed in its closed position, so that the boosting action is not performed.

In the case where at least one of the power pressure source PW, the solenoid valves SI, SD and the controller ECU is abnormal, the solenoid valves SC1, SC2, SC5, SC6, SI and SD are de-energized to return to the state as shown in FIG. 5. In this state, when the brake pedal BP is depressed, the master cylinder pressure is supplied from the pressure chamber CH1 of the master cylinder MC to the wheel brake cylinder WC through the solenoid valve SC1 placed in its open position. In this case, as the vacuum chamber V2 is communicated with the vacuum source through the solenoid valve SC6 placed in its open position, with the solenoid valve SC5 placed in its closed position, the boosting action is performed by the vacuum booster VB. When the brake pedal BP is released, an air valve (not shown) in the control valve SV is closed, while a vacuum valve (not shown) is opened. As a result, the operation of the vacuum booster VB is stopped, and the brake pedal BP is immediately returned to its initial position.

In lieu of the solenoid valves SC5, SC6 of the vacuum changeover valve device as described above, a three-port two-position solenoid operated changeover valve (not shown) may be used to select a first operating position for introducing the intake manifold vacuum, and a second operating position for communicating with the atmosphere. For instance, in the case where the power pressure source PW, the solenoid valves SI, SD and the electronic controller ECU are normal, the second operating position is selected to prohibit the operation of the vacuum booster VB, whereas in the case where at least one of the power pressure source PW, the solenoid valves SI, SD and the controller ECU is abnormal, the valve device is changed over to select the first operating position to allow the vacuum booster VB to operate.

In the embodiments as shown in FIGS. 1–4, the regulator valve RG may be formed in a body with the master cylinder MC at the tip end thereof, for example. Although the reservoirs RS1 and RS2 are formed separately in FIGS. 1–5, they may be formed in a body. Furthermore, the braking system may be formed in combination of the servo device for assisting the master cylinder MC to operate in response to operation of the brake pedal BP, and a device for prohibiting the operation of the servo device when the pressure control valve device is controlled in response to at least the amount of operation of the brake pedal. According to this braking system, the servo device may be actuated to boost the master cylinder M, in such a case where at least one of the power pressure source PW, the solenoid valves SI, SD and the controller ECU is abnormal, and in such a case where the brake pedal BP is depressed, with the ignition switch (not shown) turned off.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A braking system for an automotive vehicle, comprising:

pressure generating means for generating a first hydraulic braking pressure;

a wheel brake cylinder adapted to be operatively mounted on a wheel of said vehicle for applying a braking force to said wheel with the first hydraulic braking pressure supplied by said pressure generating means;

pressure control valve means disposed in a passage for communicating said pressure generating means with said wheel brake cylinder, said pressure control valve means controlling the first hydraulic braking pressure supplied to said wheel brake cylinder;

electronic control means for controlling said pressure control valve means at least in response to an amount of operation of a brake pedal;

a master cylinder for communicating with said wheel brake cylinder and supplying a second hydraulic braking pressure into said wheel brake cylinder in response to operation of said brake pedal, when at least one of said pressure generating means, said pressure control valve means and said electronic control means is abnormal;

a stroke simulator connected to said master cylinder for allowing said brake pedal to advance in response to the amount of operation of said brake pedal; and boosting means for assisting said master cylinder to operate only when at least one of said pressure generating means, said pressure control valve means and said electronic control means is abnormal.

2. A braking system as set forth in claim 1, wherein said boosting means supplies the first hydraulic braking pressure into said master cylinder in response to operation of said brake pedal.

3. A braking system as set forth in claim 2, further comprising:

valve means for prohibiting the operation of said boosting means when all of said pressure generating means, said pressure control valve means and said electronic control means are normal, and allowing the operation of said boosting means when at least one of said pressure generating means, said pressure control valve means and said electronic control means is abnormal.

4. A braking system as set forth in claim 1, wherein said boosting means is a vacuum booster for assisting said master cylinder to operate in response to operation of said brake pedal, with negative pressure used for activating said vacuum booster as a power source.

5. A braking system as set forth in claim 4, further comprising:

valve means for prohibiting the operation of said vacuum booster when all of said pressure generating means, said pressure control valve means and said electronic control means are normal, and allowing the operation of said vacuum booster when at least one of said pressure generating means, said pressure control valve means and said electronic control means is abnormal.

6. A braking system as set forth in claim 5, wherein said valve means includes:

a vacuum changeover valve device for selecting a first operating position for introducing the vacuum into said vacuum device and a second operating position for communicating said vacuum device with the atmosphere, said vacuum changeover valve device prohibiting the operation of said vacuum device with said first operating position and said second operating position selected, when all of said pressure generating means, said pressure control valve means and said electronic control means are normal, and said vacuum changeover valve device allowing the operation of said vacuum device with said first operating position and said second operating position selected, when at least one of said pressure generating means, said pressure control valve means and said electronic control means is abnormal.

7. A braking system for an automotive vehicle, comprising:

pressure generating means for generating a first hydraulic braking pressure;

a wheel brake cylinder adapted to be operatively mounted on a wheel of said vehicle for applying a braking force to said wheel with the first hydraulic braking pressure supplied by said pressure generating means;

pressure control valve means disposed in a passage for communicating said pressure generating means with said wheel brake cylinder, said pressure control valve means controlling the first hydraulic braking pressure supplied to said wheel brake cylinder;

electronic control means for controlling said pressure control valve means at least in response to an amount of operation of a brake pedal;

a master cylinder for communicating with said wheel brake cylinder and supplying a second hydraulic braking pressure into said wheel brake cylinder in response to operation of said brake pedal, when at least one of said pressure generating means, said pressure control valve means and said electronic control means is abnormal;

a stroke simulator connected to said master cylinder for allowing said brake pedal to advance in response to the amount of operation of said brake pedal;

boosting means for assisting said master cylinder to operate in response to operation of said brake pedal; and prohibition means for prohibiting the operation of said boosting means only when said pressure control valve means is controlled in response to at least the amount of operation of said brake pedal.

* * * * *